US011052966B2

United States Patent
Teigeler

(10) Patent No.: US 11,052,966 B2
(45) Date of Patent: Jul. 6, 2021

(54) BICYCLE CRANK ARM PEDAL HOLE COVERS

(71) Applicant: Paul Dennis Teigeler, Broomfield, CO (US)

(72) Inventor: Paul Dennis Teigeler, Broomfield, CO (US)

( * ) Notice: Subject to any disclaimer, the term of this patent is extended or adjusted under 35 U.S.C. 154(b) by 0 days.

(21) Appl. No.: 16/104,896

(22) Filed: Aug. 18, 2018

(65) Prior Publication Data

US 2020/0055564 A1   Feb. 20, 2020

(51) Int. Cl.
| | |
|---|---|
| *B62M 3/16* | (2006.01) |
| *B62J 23/00* | (2006.01) |
| *B62M 3/00* | (2006.01) |
| *B62M 1/36* | (2013.01) |

(52) U.S. Cl.
CPC ............... *B62M 3/16* (2013.01); *B62J 23/00* (2013.01); *B62M 1/36* (2013.01); *B62M 3/003* (2013.01)

(58) Field of Classification Search
CPC . B62M 3/16; B62M 1/36; B62M 3/003; B62J 23/00; Y10T 74/2164
USPC ............................................ 81/177.3; 74/608
See application file for complete search history.

(56) References Cited

U.S. PATENT DOCUMENTS

| | | | | |
|---|---|---|---|---|
| 2,585,641 A * | 2/1952 | Faso | ...................... | B25G 1/107 81/177.3 |
| 4,332,178 A * | 6/1982 | Vukich | .................. | B25B 13/00 401/7 |
| 4,960,017 A * | 10/1990 | Hsiao | .................. | B25B 27/0071 81/459 |
| 5,609,070 A * | 3/1997 | Lin | .......................... | B62M 3/16 74/558.5 |
| 5,791,203 A * | 8/1998 | Chen | ...................... | B62M 9/105 74/594.1 |
| D633,763 S * | 3/2011 | Pengra | ............................. | D8/28 |
| 2006/0101940 A1* | 5/2006 | Okada | ..................... | B62J 23/00 74/594.1 |
| 2006/0288821 A1* | 12/2006 | Girard | .................. | B25B 13/461 81/58.1 |

* cited by examiner

*Primary Examiner* — Thomas C Diaz

(57) ABSTRACT

A bicycle pedal crank arm hole protection device. The device comprises an insert installed into the crank arm hole when pedals have been removed. A mechanism to aid in the installation and removal of the device along with further protection of the device itself when removed for storage.

3 Claims, 1 Drawing Sheet

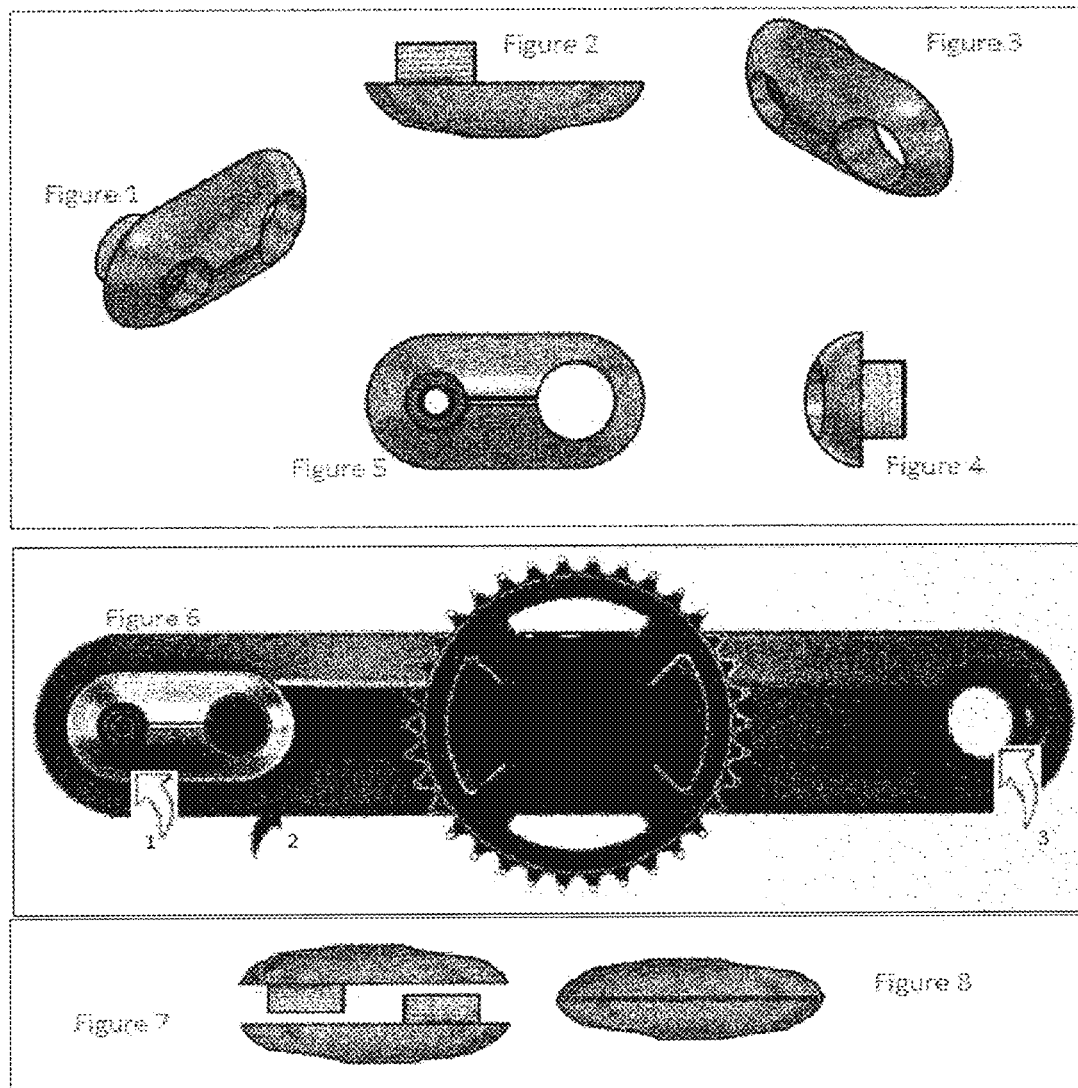

BICYCLE CRANK ARM PEDAL HOLE COVERS

DETAILED DESCRIPTION

A bicycle accessory that when installed can prevent damage to other nearby objects, including the human body when walking next to the bicycle, and help prevent theft of the bicycle by removing the means where by a potential thief can pedal off on the bicycle.

BACKGROUND OF THE INVENTION

This invention relates to bicycle security and protection devices.

Bicycle riders and mountain bikers may need to occasionally carry their bike over rough terrain, especially if a part of the bicycle breaks rendering the bicycle un-rideable and will often remove their pedals to ease in transporting the bike. A disadvantage of this is the contamination of the resulting open pedal crank arm hole.

Pedals are also often removed for storage of a bicycle. Long term storage of a bicycle with an exposed pedal crank arm hole can cause contamination of the threads in the crank arm holes.

SUMMARY OF THE INVENTION

This invention provides a device to protect a bicycle pedal crank arm hole. The device is designed to be threaded into the standardized pedal crank arm hole.

In a standard bicycle the pedals can be removed from the crank arm for transporting or storing the bicycle. Once the pedals are removed, the resulting pedal hole is subject to contamination from debris or environmental conditions. This contamination can cause damage to the threads in the crank arm pedal hole which can cause cross threading or cross-threading. In addition, when pedals have been removed for longer periods of storage, corrosion can occur in the pedal holes.

BRIEF DESCRIPTION OF THE DRAWINGS

For the invention to be more easily understood, the device will be described and illustrated in the accompanying drawings.

FIG. 1 is the outside side view of the bicycle pedal crank arm hole cover showing the smaller hole where the threaded insert attaches.

FIG. 2 is the top view of the bicycle pedal crank arm hole cover showing the threads that thread horizontally into the bicycle pedal crank arm hole.

FIG. 3 is the outside side view of the bicycle pedal crank arm hole cover showing the larger finger hole used for tightening the assembly against the bicycle pedal crank arm.

FIG. 4 is the end view of the bicycle pedal crank arm hole cover showing the rounded outer portion and flat portion that sits flush against the pedal crank arm.

FIG. 5 is the outside view of the bicycle pedal crank arm hole cover showing the rounded outer portion and the smaller hole where the threaded insert attaches and the larger finger hole used for tightening the assembly against the bicycle pedal crank arm FIG. 6 is a view of the bicycle pedal crank arm hole cover (1) installed and aligned on the bicycle pedal crank arm (2) and the opposing bicycle pedal crank arm hole (3).

FIG. 7 shows the two bicycle pedal crank arm hole covers aligned and ready to be mated for storage when removed from the bicycle.

FIG. 8 shows the compact storage position of the two bicycle pedal crank arm hole covers when removed from the bicycle.

DESCRIPTION OF THE INVENTION

Referring to the drawings, FIGS. 1 through 5 illustrate the device when not in use. The threaded insert is designed to fit a standard sized pedal crank arm hole.

To install as shown in FIG. 6, the cover (1) is threaded into the pedal crank arm hole (3) in the pedal crank arm (2).

When installed, the pedal crank arm hole is completely protected from contamination. The device fits flush and aligned in the same direction on the pedal crank arm. FIG. 7 illustrates that when not in use, the set of bicycle crank arm hole covers are designed to clamshell together with opposing ends opposite from each other with the insert of one in the finger hole of the other, flat edges facing each other to prevent the device itself from becoming contaminated with debris.

As shown in FIGS. 1-8, the protective device comprises at least one cover element. The at least one cover element having a front face (4) and a rear face (5). The front face being shaped as an oval ellipsoid. The front face further comprising a first circular recess (6) positioned at one of the elongated ends of the front face and a second circular recess (7) positioned at the other of the elongated ends of the front face. The second recess being formed as a through hole. The first circular recess being counter sunk into the front face. The first circular recess further comprising a through hole (8) formed at its base. The through hole of the first circular recess being smaller in diameter than a diameter the first circular recess and designed for the purpose of receiving a fastener for a bicycle crank arm. The second circular recess being larger in diameter than the first circular recess and designed so as to allow a user's finger to be inserted therein for tightening of said fastener. The rear face having a planar shape, and further comprising a cylindrical protrusion (9) positioned at the elongated end of the front face which has the first circular recess. The protrusion containing the through hole of the first circular recess.

What I claim is the uniqueness of:
1. A protective bicycle pedal crank arm hole cover comprising:
at least one cover element, the at least one cover element having a front face and a rear face,
the front face being shaped as an oval ellipsoid, the front face further comprising a first circular recess positioned at one of the elongated ends of the front face and a second circular recess positioned at the other of the elongated ends of the front face, the second recess being formed as a through hole,
the first circular recess being counter sunk into the front face, the first circular recess further comprising a through hole formed at its base, the through hole of the first circular recess being smaller in diameter than a diameter the first circular recess and designed for the purpose of receiving a fastener for a bicycle crank arm,
said second circular recess being larger in diameter than the first circular recess and designed so as to allow a user's finger to be inserted therein for tightening of said fastener, the rear face having a planar shape, the rear face further comprising a cylindrical protrusion positioned at the elongated end of the front face which has the first circular recess, the protrusion containing the through hole of the first circular recess.

2. A protective bicycle pedal crank arm hole cover of claim 1, wherein the at least one cover element comprises two cover elements, the two cover elements designed to clamshell or nest in each other by having their planar sides face each other with each of their protrusions fitting inside the other's second circular recess.

3. A protective bicycle pedal crank arm hole cover of claim 1, wherein the at least one cover element is attached to a bicycle crank arm at one of the bicycle crank arm holes so as to provide protection to said fastener which is utilized for said bicycle crank arm hole.

\* \* \* \* \*